United States Patent
Förnsel et al.

(10) Patent No.: US 6,355,312 B1
(45) Date of Patent: Mar. 12, 2002

(54) METHODS AND APPARATUS FOR SUBJECTING A ROD-LIKE OR THREAD-LIKE MATERIAL TO A PLASMA TREATMENT

(75) Inventors: Peter Förnsel, Spenge; Christian Buske, Steinhagen, both of (DE)

(73) Assignee: Cottin Development, Inc., Zurich (CH)

( * ) Notice: Subject to any disclaimer, the term of this patent is extended or adjusted under 35 U.S.C. 154(b) by 0 days.

(21) Appl. No.: 09/418,561

(22) Filed: Oct. 15, 1999

(30) Foreign Application Priority Data

Oct. 16, 1998 (DE) .......................... 198 47 774

(51) Int. Cl.⁷ .................. H05H 1/34; H05H 1/42; H05H 1/48; B05D 1/00; B05D 3/08; B05D 3/06
(52) U.S. Cl. .................. 427/565; 427/580; 427/488; 427/491; 427/540; 427/538
(58) Field of Search ................ 427/538, 535, 427/534, 539, 488, 491, 569, 446, 540, 580; 204/192.38; 216/71; 219/121.38, 121.41, 121.44, 121.46, 121.47, 121.48, 121.49

(56) References Cited

U.S. PATENT DOCUMENTS

| | | | |
|---|---|---|---|
| 3,211,886 A | * 10/1965 | Barkan et al. .............. 219/121 |
| 4,568,563 A | * 2/1986 | Jackson et al. ............. 427/538 |
| 4,587,135 A | * 5/1986 | Diener et al. | |
| 4,810,054 A | * 3/1989 | Shinbori et al. ......... 350/96.21 |
| 4,869,936 A | * 9/1989 | Moskowitz et al. ........ 427/423 |
| 5,053,246 A | * 10/1991 | Shuttleworth et al. ...... 427/538 |
| 5,108,780 A | * 4/1992 | Pitt et al. ..................... 427/538 |
| 5,114,738 A | * 5/1992 | Savage et al. | |
| 5,120,567 A | 6/1992 | Frind et al. | |
| 5,144,110 A | * 9/1992 | Marantz et al. ........ 219/121.47 |
| 5,296,670 A | * 3/1994 | Dorfman et al. ....... 219/121.48 |
| 5,354,963 A | * 10/1994 | Müller et al. .......... 219/121.54 |
| 5,376,413 A | * 12/1994 | Callebert et al. ........... 427/538 |
| 5,493,094 A | * 2/1996 | Simmons ............... 219/121.59 |
| 5,734,144 A | * 3/1998 | Yamaguchi et al. ... 219/121.46 |
| 5,837,958 A | 11/1998 | Förnsel | |
| 6,080,954 A | * 6/2000 | Inoue et al. | |
| 6,121,572 A | * 9/2000 | Holste et al. .......... 219/121.59 |

FOREIGN PATENT DOCUMENTS

DE 42 35 766 5/1994

OTHER PUBLICATIONS

Abstract (JPO) of JP08124697A, Pub. date May 17, 1996 by Tashero Eiichi.

* cited by examiner

*Primary Examiner*—Marianne Padgett
(74) *Attorney, Agent, or Firm*—Burns, Doane, Swecker & Mathis, LLP

(57) ABSTRACT

A rod-like or thread-like material is subjected to a plasma treatment by passing the material coaxially through a plasma nozzle while generating plasma therein.

5 Claims, 3 Drawing Sheets

METHODS AND APPARATUS FOR SUBJECTING A ROD-LIKE OR THREAD-LIKE MATERIAL TO A PLASMA TREATMENT

BACKGROUND OF THE INVENTION

The invention relates to a method and apparatus for the plasma treatment of rod-like or thread-like materials.

The surface of several materials, in particular synthetic resins, cannot, or only with difficulties, be wetted with liquid. When a print, lacquer or an, adhesive layer shall be applied to such materials, a pretreatment of the surface thereof is therefore normally required.

A conventional method to enhance the capability of plastics surfaces to be wetted consists of applying a corona discharge to the surface. In contrast, European Document 0 761 41 5-A2 discloses a method in which the pretreatment is not performed by means of corona discharge but by means of a low temperature plasma under atmospheric pressure. A plasma nozzle for performing this method is also disclosed in the cited document. During pretreatment, the plasma nozzle is directed onto the surface to be treated, so that the plasma jet scans the surface like a painting brush.

The materials to be treated can also be rod-like or thread-like materials such as synthetic fibers, yarns, threads, wires, plastic-coated cables, glass fibers and the like.

It is an object of the invention to provide a method and apparatus with which a particularly efficient plasma treatment of such rod-like or thread-like material is made possible.

SUMMARY OF THE INVENTION

According to the invention, there is provided a method for plasma treatment of rod-like or thread-like material, wherein the material is passed coaxially through a plasma nozzle.

According to another aspect of the invention, an apparatus for treating rod-like or thread-like material comprises a plasma nozzle having a nozzle pipe which forms an outer electrode and an inner electrode disposed coaxially in said nozzle pipe, wherein a passage is formed coaxially in said inner electrode for passing the material to be treated therethrough.

Typically, a plasma nozzle which forms the essential part of the apparatus for performing the method according to the invention comprises a nozzle pipe having an outlet end and forming an annular or tubular outer electrode at least at said outlet end. A working gas flows through this nozzle pipe. A stud-shaped inner electrode is formed coaxially inside of the nozzle pipe. The plasma is generated by an electric discharge between the inner and outer electrodes. To this end, a high voltage, preferably an AC voltage with high frequency, is applied to the electrodes. A generator for providing this voltage is described in German Document No. 42 35 766.

In the apparatus according to the invention, the inner electrode of the plasma nozzle is formed with a coaxial passage, and the rod-like or thread-like material to be treated passes through this passage. Thus, the material passes centrally and coaxially through the plasma flame jetted out from the plasma nozzle, and the entire peripheral surface of the material can evenly be treated in a single process.

The method according to the invention is also suitable for plasma polymerization or plasma coating of the material. In the latter case, the coating material is supplied in a gaseous state together with the working gas or via separate nozzles disposed at appropriate positions.

Preferably, the working gas is swirled in the nozzle pipe. This imports also a swirling movement to the plasma flame jetted out from the nozzle so that the plasma flows around the material in vortex fashion and is thereby brought in intimate contact with the surface of the material.

At least in those cases in which the material to be treated is not electrically conductive, the material can freely pass through the nozzle pipe over a substantial portion of its length. By swirling the working gas, a vortex is created in the nozzle pipe, and the arc of the electric discharge Is channelled inside of the nozzle pipe in the core of this vortex, so that it will not fan-out to the surrounding outer electrode before it reaches the outlet end of a nozzle. When the material passes through the nozzle pipe, the electric arc channelled in the manner described above will wind helically around the material, without however contacting the same. Thus, it is also possible to achieve a thermal treatment of the surface of the material, the intensity of this treatment being controllable by controlling the swirling movement of the working gas and/or by supply of a secondary gas.

In case of certain materials, in particular materials having a relatively rough or fluffy surface such as staple fibers, leak air can be entrained when the fiber passes with high velocity through the passage formed in the inner electrode. This effect, by which the action of the plasma or the thermal action may possibly be deteriorated, can be avoided or mitigated by creating a subatmospheric pressure in the passage of the inner electrode.

BRIEF DESCRIPTION OF THE DRAWING

Preferred embodiments of the invention will, be described below in conjunction with the accompanying drawings, in which.

DETAILED DESCRIPTION OF PREFERRED EMBODIMENTS OF THE INVENTION

Figure 1:
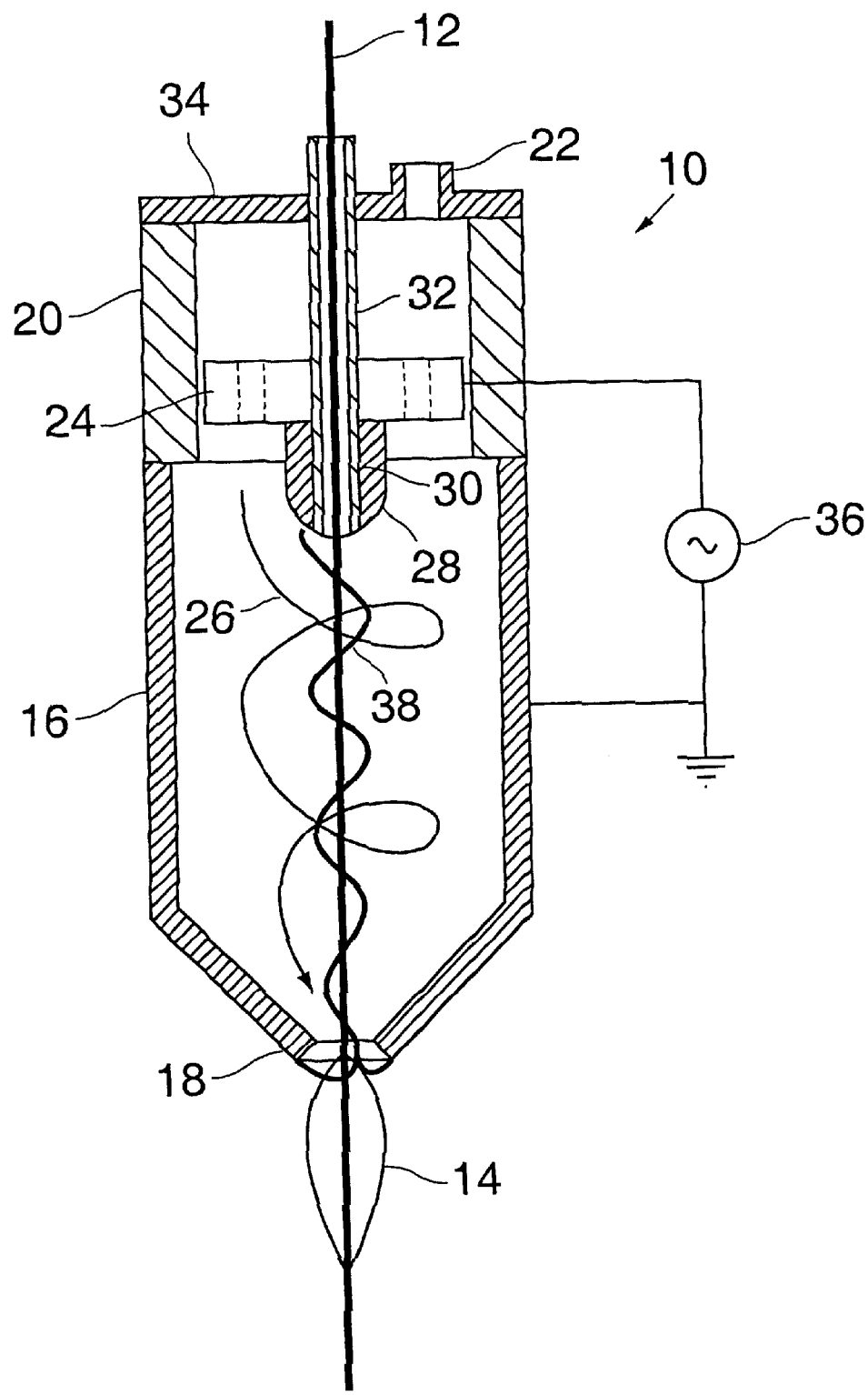
FIG. 1 is a schematic longitudinal sectional view through a plasma nozzle according to a first embodiment of the invention.

FIG. 1 shows a plasma nozzle 10 which forms the essential part of an apparatus for plasma treatment of a rod-like or thread-like element which will hereafter be referred to as a fiber 12. The fiber 12 may for example be formed of synthetic resin and supplied directly from a spinning machine, or drawn off from a bobbin (not shown), and is drawn coaxially through the plasma nozzle 10 with a speed between 0.05 and 25 m/s, preferably between 5 and 25 m/s, for example. The fiber thereby passes through a free (atmospheric) plasma flame 14 jetted out from the nozzle 10 and is pretreated evenly on its entire peripheral surface by the action of the plasma, for example, in order to increase the capability of the fiber to be wetted with liquids.

The plasma nozzle 10 has a nozzle pipe 16 which is made of electrically conductive material and at the same time forms an outer electrode and is tapered towards an outlet port 18. A ceramic pipe 20, into which a working gas such as pressurized air can be introduced via an inlet port 22 is adjoined to the upstream end of the nozzle pipe 16. A swirl system 24 is provided Inside of the ceramic pipe 20. This swirl system is essentially formed by a metal disk penetrated by helical bores. The swirl system 24 imparts a swirling motion to the pressurized air supplied therethrough, so that, inside of the nozzle pipe 26, a vortex 26 is formed around the fiber 12 passing therethrough. A stud-shaped, inner electrode 28 is electrically connected to the swirl system 24 and projects into the interior of the nozzle pipe 16. The stud electrode 28 has an axial passage 30 passing therethrough, and a ceramic guide tube 32 is inserted into this passage. The guide tube 32 extends through the swirl system 24 and through an end wall 34 of the plasma nozzle forming the inlet port 22. The fiber 12 passes through the guide tube 34.

In the shown embodiment, the nozzle pipe 16 is grounded, and a voltage is applied to the Inner electrode 28 by means of a high frequency generator 36. When the voltage is switched on, an initial corona discharge is created which then ignites an arc discharge. The electric arc 38 created thereby is entrained by the swirling flow of air and is prevented from passing directly to the outer electrode. Thus, the arc 38 follows the core of the vortex 26. If the fiber 12 were not present, then the vortex core and the electric arc would extend along the axis of the nozzle pipe. Since, however, the vortex-flow is disturbed by the fiber 12, the arc winds helically around the fiber 12. The surface of the fiber 12 can be treated or pretreated thermally by intensive heat radiation emitted from the arc 38.

Only when the arc 38 reaches the outlet port 18 of the nozzle pipe, it fans-out into several branches which pass radially to the outer electrode and are rotated about the axis of the nozzle by the swirling air flow. In the region of the outlet port 18 a highly reactive hot plasma is formed which can be seen as a blue-violet light when air is used as working gas. This hot plasma causes an activation of the surface of the fiber 12, and this effect is enhanced by the preceding thermal pretreatment of the fiber.

Finally, the fiber passes through the free plasma 14 which, due to the swirling motion, is choked closely around the fiber. The proper plasma treatment takes place in this free plasma zone through chemical/physical modification of the material. The plasma Is accelerated because of the conical shape of the nozzle pipe and because of a volume expansion caused by the production of excited plasma, so that an elongated plasma flame and, accordingly, an intensive treatment of the fiber 12 is achieved.

For a given configuration of the plasma nozzle 10 the efficiency and intensity of the treatment can be optimized and adapted to the material composition of the fiber 12 and to the respective purpose of the treatment by modifying the following parameters: the speed at which the fiber passes through the nozzle, the flow rate and chemical composition of the working gas, and the voltage level and amplitude of the high voltage.

In addition, special effects can be achieved by changing the configuration of the nozzle and/or by appropriate members being built into the nozzle.

Figure 2:
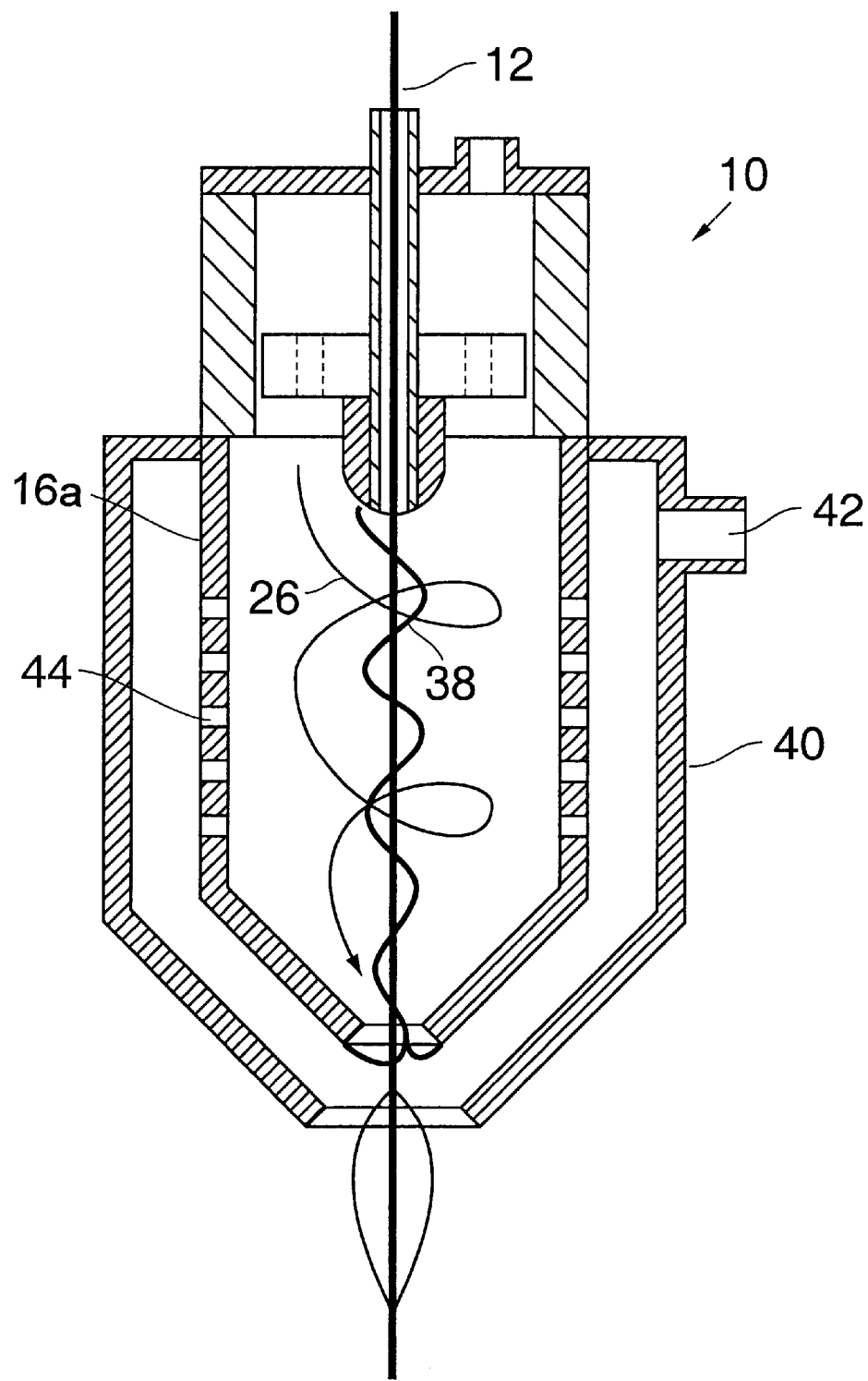
FIG. 2 is a view similar to FIG. 1 of a second embodiment.

FIG. 2 shows an embodiment in which the nozzle pipe is surrounded by an outer sleeve 40 which is also tapered towards the outlet port. A secondary gas, such as air for example, is supplied into the outer sleeve through an inlet port 42. Then, the flow rate of the secondary gas forms another parameter with which the geometry of the plasma can be modified. The secondary gas may also be swirled in the same sense or in the sense opposite to that of the primary working gas and at the same time has the function of cooling the nozzle pipe 16a. As the case may be, a chemical treatment or coating of the fiber 12 can be achieved by an appropriate chemical composition of the secondary gas.

Since the cross section of the outer sleeve 40 is reduced towards the outlet port, a portion of the secondary gas enters the interior of the nozzle pipe 16a through radial through holes 44. This causes a pinching of the vortex 26 inside of the nozzle pipe 16a, with the result that the arc 38 will wind more closely around the fiber 12. Thus, the efficiency of the thermal pretreatment by the arc 38 can be specifically controlled by means of the flow rate of the secondary air.

Figure 3:
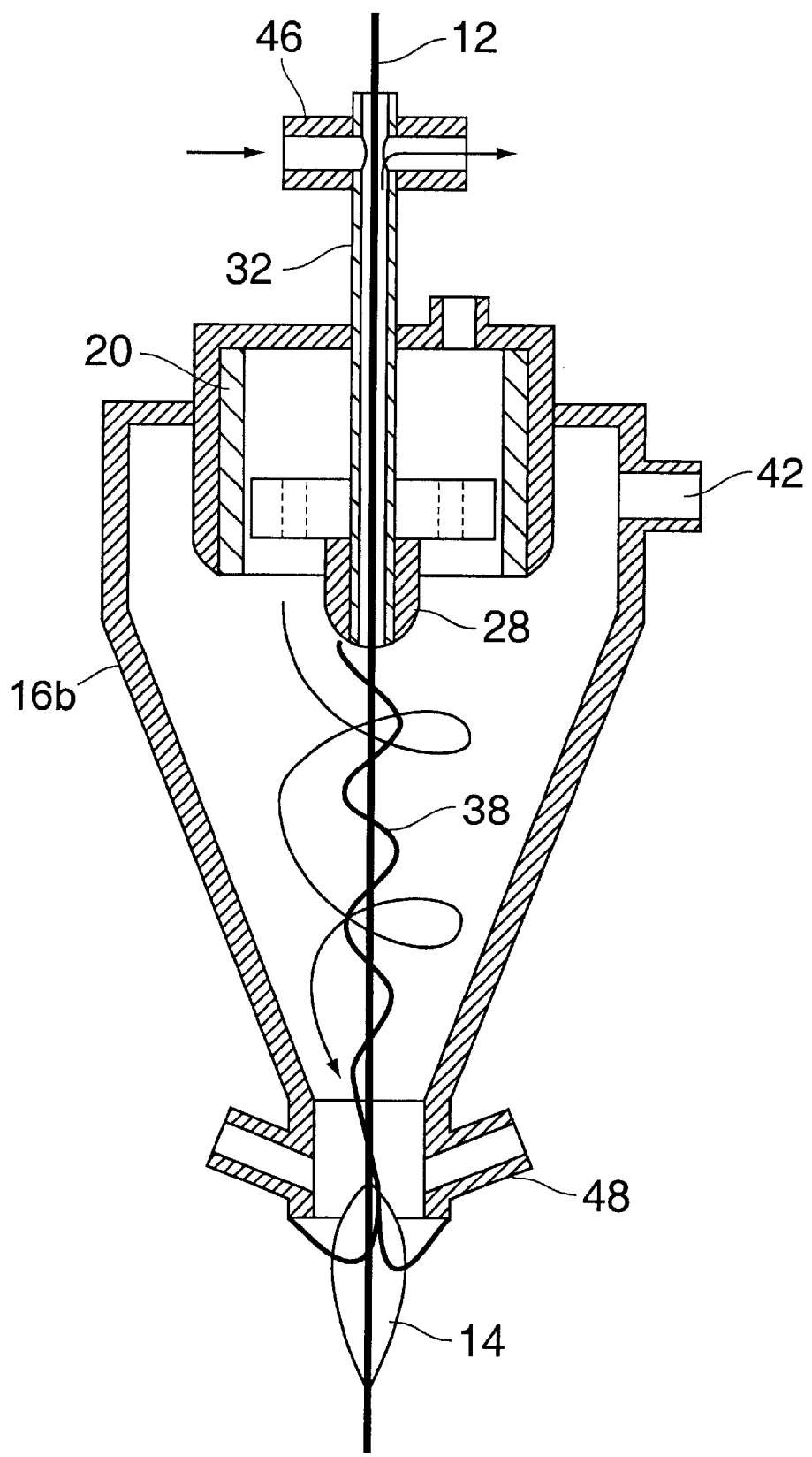
FIG. 3 is a view similar to FIG. 1 of a third embodiment.

A similar effect can also be achieved with the arrangement according to FIG. 3, in which the nozzle pipe 16b has a longer conical section and further has an inlet port 42 in the upper cylindrical part which surrounds the ceramic pipe 20. The secondary gas can be supplied through this inlet port 42 in a swirled or nonswirled manner directly into the nozzle pipe.

In this embodiment, the guide tube 32 upstream of the plasma nozzle 10 is connected to a cross passage 46 through which pressurized air flows with high velocity. Thus, according to the jet pump principle, a suction pressure is created in the guide tube 32 through which the fiber 12 passes. In the section of the guide tube 32 between the cross passage 46 and the mouth of the inner electrode 28 there will therefore be formed an air current which is directed upwardly, i.e. opposite to the direction of movement of the fiber 12. This measure mitigates or suppresses the possibility of air being entrained by the fiber 12 rapidly passing through the guide tube, which would otherwise have the result that the air entrained by the fiber through the guide tube would disturb the flow conditions in the nozzle pipe 16b.

FIG. 3 further illustrates a possibility to supply a coating gas for plasma coating of the fiber 12. To this end, the portion of the nozzle pipe 16b in the vicinity of its outlet port is provided with several supply lines 48 through which the coating gas is directly supplied into the hot plasma zone.

In other embodiments, the coating gas could be supplied into the free plasma 14. Likewise, it is possible to admix the coaling gas to the primary gas or the secondary gas. If no suction pressure is generated in the guide tube 32, then the coating gas could be supplied through this guide tube.

If the fiber 12 consists of electrically conductive material or is being coated with electrically conductive material, then the electric arc 38 must not be transferred directly onto the fiber. If the fiber 12 is grounded, this can be achieved for example by grounding the inner electrode 28 and, instead, applying the voltage to the nozzle pipe 16b and/or by extending the guide tube 32 beyond the inner electrode 28 into the hot plasma zone or even into the free plasma 14.

The method described above is suitable for the plasma treatment and/or thermal treatment of rod-like or- thread-like materials which should preferably have a round or essentially round cross section. Depending on the configuration of the plasma nozzle, the diameter of the material to be treated may for example be in the order of 0.1 to 10 mm.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method for the plasma treatment of an elongated member, comprising the steps of:

A) passing the member through a plasma nozzle along an axis defined by first and second ports of the nozzle;

B) conducting a working gas through the nozzle and around the member, the working gas exiting the nozzle through one of the first and second ports which constitutes a gas outlet port;

C) applying a voltage between an outer electrode disposed at the gas outlet port and an inner electrode disposed in the nozzle at a distance from the outer electrode, to generate an electric arc in the nozzle extending between the inner and outer electrodes;

D) causing the electric arc to react with the working gas to create a plasma flame at the gas outlet port, the member passing completely through the plasma flame to produce a heat treatment of an outer surface of the member; and E) causing the working gas to swirl within the nozzle such that the working gas and the plasma flame swirl helically around the member, and the electric arc is constrained by the helically swirling working gas to wind helically around the member.

2. Method as claimed in claim 1, for plasma coating said member, wherein a coating gas is supplied into said plasma generated by said plasma nozzle and coats said member.

3. Method as claimed in claim 1, for plasma coating said member, wherein a coating gas is supplied into said plasma nozzle and coats said member.

4. Method as claimed in claim 1, wherein a secondary gas is supplied into said plasma nozzle in an outer circumferential region of a swirling flow of said working gas.

5. Method as claimed in claim 1, wherein the member exits the nozzle through the gas outlet port.

* * * * *